(12) United States Patent
Hsu et al.

(10) Patent No.: US 6,436,358 B1
(45) Date of Patent: *Aug. 20, 2002

(54) METALS REMOVAL FROM SPENT SALTS

(75) Inventors: Peter C. Hsu, Pleasanton; Erica H. Von Holtz, Livermore; David L. Hipple, Livermore; Leslie J. Summers, Livermore; William A. Brummond, Livermore; Martyn G. Adamson, Danville, all of CA (US)

(73) Assignee: The Regents of the University of California, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/316,485

(22) Filed: May 21, 1999

Related U.S. Application Data

(63) Continuation-in-part of application No. 09/259,784, filed on Mar. 1, 1999.

(51) Int. Cl.[7] .............................................. C01G 56/00
(52) U.S. Cl. ................... 423/11; 423/3; 423/6; 423/10; 423/21.1; 423/42; 423/87; 423/92; 423/101
(58) Field of Search ............................ 423/11, 3, 6, 12, 423/10, 21.1, 23, 87, 89, 99, 42, 92, 101

(56) References Cited

U.S. PATENT DOCUMENTS 5,656,009 A * 8/1997 Feng et al.

OTHER PUBLICATIONS

Removal of Uranium from Spent Salt from the Molten Salt Oxidation Process, LEslie Summers et al., URCL–ID–126857, Mar. 1997 (published Oct. 1997), Lawrence Livermore National Laboratory, pp. 1–11.*

* cited by examiner

Primary Examiner—Steven P. Griffin
Assistant Examiner—Christina Ildebrando
(74) Attorney, Agent, or Firm—Ann M. Lee; Alan H. Thompson

(57) ABSTRACT

A method and apparatus for removing metal contaminants from the spent salt of a molten salt oxidation (MSO) reactor is described. Spent salt is removed from the reactor and analyzed to determine the contaminants present and the carbonate concentration. The salt is dissolved in water, and one or more reagents may be added to precipitate the metal oxide and/or the metal as either metal oxide, metal hydroxide, or as a salt. The precipitated materials are filtered, dried and packaged for disposal as waste or can be immobilized as ceramic pellets. More than about 90% of the metals and mineral residues (ashes) present are removed by filtration. After filtration, salt solutions having a carbonate concentration >20% can be spray-dried and returned to the reactor for re-use. Salt solutions containing a carbonate concentration <20% require further clean-up using an ion exchange column, which yields salt solutions that contain less than 1.0 ppm of contaminants.

31 Claims, 3 Drawing Sheets

METALS REMOVAL FROM SPENT SALTS

RELATED APPLICATIONS

This application is a continuation-in-part of U.S. patent application Ser. No. 09/259,784, filed Mar. 1, 1999. Such application is incorporated herein by reference.

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to the removal of metals and ashes from spent salt generated from a molten salt oxidation reactor. In particular, this method removes primarily Group VIII metals such as chromium, nickel, iron, molybdenum, and the like, from spent salt to facilitate recycling of the salt for reuse in the reactor or disposal of the salt as non-hazardous waste.

2. Description of Related Art

Molten salt oxidation (MSO) is a thermal process that is capable of destroying organic constituents of energetic materials, hazardous wastes, and mixed wastes (i.e., wastes containing both organic and radioactive materials). In this process, combustible waste and air are introduced into a bath of molten carbonate salt (typically sodium carbonate), where the organic constituents of the waste materials are oxidized to carbon dioxide, nitrogen, and water. Inorganic products resulting from the reaction of the molten salt with the halogens, sulfur, phosphorous, metals, and radionuclides introduced into the salt bath must be removed to prevent the excessive build-up of inorganic products in the sodium carbonate. The excess build-up of these products in the carbonate salt can result in a dramatic drop in the efficiency of the system and can greatly increase the amount of toxic off-gases produced.

The carbonate salt serves both as a chemical reagent and as an acid scrubber to neutralize any acidic by-products produced during the waste destruction process. As the carbonate content in the salt decreases, the efficiency of the process decreases. At a certain point, the salt is removed from the reactor and the hazardous constituents are separated from the salt.

Because many of the metals and radionuclides captured in the salt are hazardous, the spent salt removed from the reactor can create a large secondary waste stream without further treatment. Thus, there is a need for a spent salt clean-up and recovery system to segregate these materials and minimize the amount of secondary waste. Once the hazardous constituents have been isolated, they can then be encapsulated for final disposal. This invention describes a separation strategy developed for metals and ashes removal from mixed spent salt and provides a way to reduce the consumption of fresh salt and to reduce the amount of secondary waste.

SUMMARY OF THE INVENTION

The present invention is a method for removing primarily metal contaminants and ashes from the spent salt of a molten salt oxidation (MSO) reactor. Removal of these contaminants enables the secondary waste stream generated by the MSO operation to be kept at a minimum. Once the contaminants are removed, the spent salt may either be re-used in the MSO process or disposed as non-hazardous waste. If the salt still contains a high amount of carbonate (usually greater than about 20%), it will be recycled into the MSO reactor through the apparatus of the invention. If the salt contains a low amount of carbonate (less than about 20%), it no longer serves a useful purpose in the MSO process and will therefore be disposed through apparatus of the invention. Although this invention may be applied generally to metals, and more particularly to Group I, II, and VIII metals, the processes emphasized herein will be for removing "reducible metallic ions" from MSO spent salt that are capable of being reduced to more insoluble metallic ionic forms of such ions.

To begin removal of the contaminants, the spent salt is cooled to ambient temperature, removed from the reactor, ground up, analyzed, and dissolved in water to form a primary salt solution. Most of the mineral residues in the spent salt have low solubilities in water, depending upon solution pH values, and are precipitated from the primary salt solution as metal oxides, metal hydroxides, and ash, during the dissolution step. The pH of the primary salt solution is normally highly alkaline, usually due to the concentration of carbonate present. Optionally, an alkali hydroxide such as sodium hydroxide and/or a sulfiding agent such as NaHS can added to the primary salt solution, causing the metals (e.g., metallic ions) present in the primary salt solution to form additional insoluble precipitates. The primary salt solution containing precipitate is filtered to yield (1) a filtrate, i.e., a secondary salt solution, and (2) a contaminated filter cake, i.e., a waste solid containing a majority of the metal contaminants of the spent salt, i.e., a "majority waste solid." The majority waste solid is dried and packaged for disposal as secondary waste. Alternatively, the cake can be mixed with ceramic powder to form stabilized pellets after calcination and sintering.

Remaining dissolved metal contaminants present in the secondary salt solution can be removed by reducing the valence or oxidation number of the reducible metallic ions of such metal contaminants to oxidation states of such metallic ions that form slightly soluble or insoluble species of oxides, hydroxides, and similarly-related precipitates. A reducing agent, such as an alkali hyposulfite or an alkali dithionite, is added to reduce the oxidation state of a reducible metallic ion such as chromium from Cr(VI) to Cr(III). Once the oxidation state is reduced, chromium precipitates as insoluble chromium species such as an oxide ($Cr_2O_3$) or hydroxide ($Cr(OH)_3$, which can be filtered and disposed of as a "minority waste solid" while a "clean" salt solution is collected for eventual recycle to the MSO reactor or further processed.

Generally, the preceding precipitation and filtration steps remove more than about 90% of the metal contaminants that are present in the original or primary spent salt solution. The filtered, clean salt solution obtained in conjunction with the minority waste solid may be further treated depending on whether the salt is to be disposed of or reused. If the salt is destined for re-use, it can be dried using a spray dryer and returned to the MSO reactor. If the salt is to be disposed of, a further clean-up step is necessary. The additional clean-up is accomplished by sending the cleaned solution through, for example, a commercially available ion exchange column (such as Diphonix™), which yields "super-clean" salt solutions that contain less than 0.1 ppm of metal contaminants.

BRIEF DESCRIPTION OF THE DRAWINGS

The accompanying drawings, which are incorporated into and form part of this disclosure, illustrate embodiments of the invention and together with the description, serve to explain the principles of the invention.

FIG. 1 is a process flow chart for metal contaminant removal from spent salt and eventual recycle of the cleaned salt to an MSO reactor.

DETAILED DESCRIPTION OF THE INVENTION

The present invention is a method for removing metals from the spent salt of an MSO reactor. As the MSO process continues to run, inorganic products build up in the salt bath as a result from the reaction of halides, sulfides, phosphates, metals, etc., with carbonate. Such inorganic products must be removed to prevent complete conversion of the sodium carbonate, which can result in eventual losses of destruction efficiency and acid scrubbing capability in the MSO reactor. When the MSO reactor is used to oxidize combustible solids, "ash" (e.g. mineral residues such as $Al_2O_3$ and $SiO_2$) also builds up in the salt melt and increases the viscosity of the melt. High viscosity can affect destruction efficiency; at this point the salt must be withdrawn and the ash removed.

Because many of the metals and/or radionuclide contaminants captured in the spent salt are hazardous and/or radioactive, without further treatment the removed spent salt can create a large secondary waste stream. The spent salt clean-up/recovery method of the invention can segregate these contaminants and minimize the amount of secondary waste, typically reducing the secondary waste to less than 10, and preferably to less than 5 weight percent of the weight of the original spent salt removed from the MSO reactor. The waste material materials can then be encapsulated for final disposal.

Pathways are described herein to treat the spent salt, depending on both the composition of the salt and the hazardous materials contained within it. Although the invention may be applied to metals in general, Groups IB, IIA, IIB, IVB and VIII (e.g., transition elements) are of particular interest and their removal emphasized. There are two operational modes for salt removal: (1) during reactor operation, a slip-stream of molten salt is continuously withdrawn with continuous replacement by carbonate, or (2) the spent salt melt is discharged completely and the reactor then refilled with carbonate in batch mode. The present invention focuses primarily on the continuous mode process.

Figure 1:
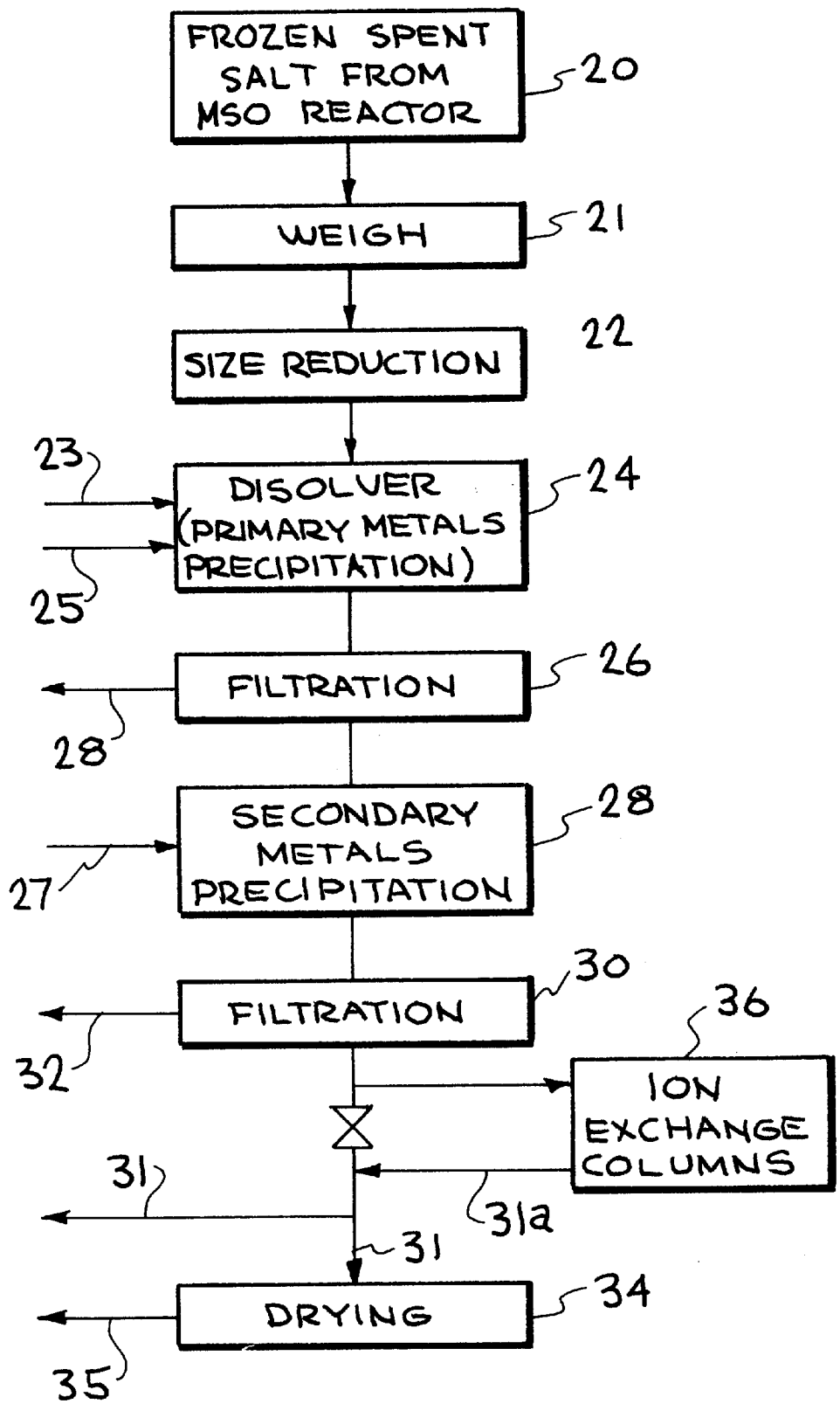

FIG. 1 shows a block flow diagram of the spent salt cleanup/recovery system of the invention. The spent salt is first withdrawn from the MSO reactor, normally frozen and cooled to ambient temperature (represented as step 20). The removed salt can be weighed (represented as step 21) to determine the amount of water necessary to completely dissolve the salt in light of the solubilities of the salt components. The dissolution of the ground spent salt by added water 23 can be enhanced by heating the water and/or primary salt solution formed from the water and spent salt. To facilitate easy dissolution into water to form the primary salt solution, the salt from the MSO reactor is ground into small particles generally no larger than about 6 to 12 mm using a commercial grinder (represented as step 22) before processing the spent salt in the salt clean-up step.

Small spent salt particles are preferred to reduce the dissolution time.

Table 1 shows salt dissolution time in room temperature water as a function of particle size. For example, smaller spent salt particle containing 10 mole % sodium chloride and 90 mole % sodium carbonate, dissolved in 30% excess water while mixing at 400 rpm exhibit faster dissolution time.

TABLE 1

Dissolution Time of High Carbonate Spent Salt in Room Temperature Water

| Particle size | Dissolution time |
| --- | --- |
| <1.2 mm | <15 minutes |
| 1.2–3.3 mm | <15 minutes |
| 3.3–5.6 mm | <15 minutes |
| ≥5.6 mm | <30 minutes |

After the size reduction, the overall clean-up method chosen is usually dependent on the concentration of carbonate in the spent salt. When the concentration of carbonate in the spent salt is low, typically below 20% carbonate, the salt's final destination is usually disposal whereas when the spent salt has more than 20% carbonate it is usually recycled.

The spent salt from the MSO reactor usually has a concentration of carbonate (e.g., sodium carbonate) greater than 10 wt. %, and normally about 40 to about 90 wt. %. Accordingly, recycle of the spent salt is the more common mode of operation. Other common ingredients in the spent salt include sodium chloride from about 0 to about 50 wt. %, chromium from about 500 to about 10,000 ppmw, nickel from about 1,000 to about 10,000 ppmw, and iron, copper, zinc, molybdenum, aluminum, silicon (e.g., $SiO_2$) any or all from about 100 to about 10,000 ppmw.

Figure 2:
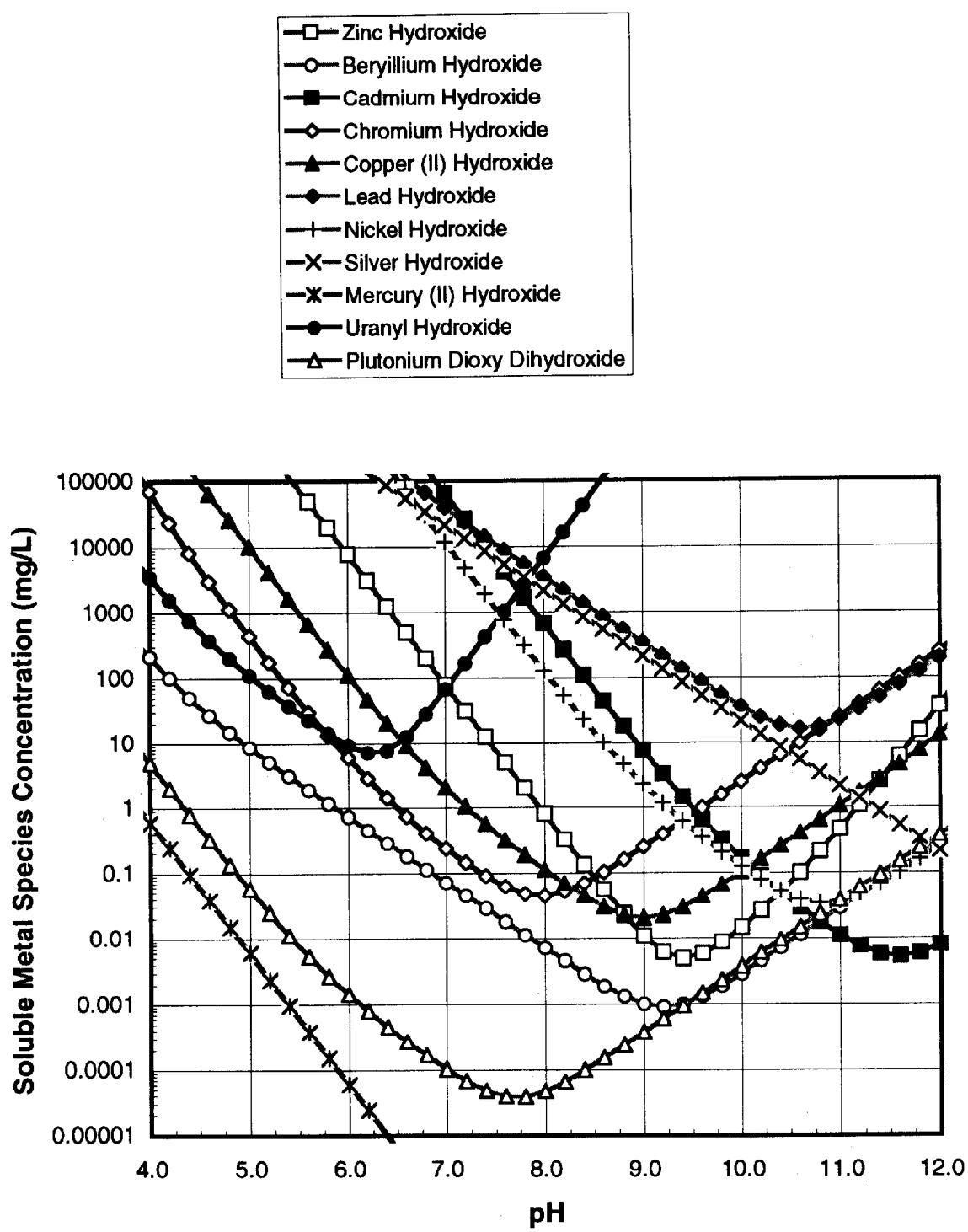
FIG. 2 is a solubility table of soluble metal species found in spent salt from an MSO reactor illustrating concentrations as a function of pH of a salt solution.

Most of the mineral residues in the spent salt have low solubilities in water, depending on solution pH values, and can precipitate as metal oxides and metal hydroxides during the dissolution step (represented as dissolver 24). FIG. 2 shows solubilities of several metal species in water at room temperature. Although solubilities vary greatly with solution pH values, most metal species contained in the spent salt are less soluble in alkaline solutions. Table 2 shows optimum pH value that can minimize the solubility for each metal species in the primary salt solution. Therefore, it is desirable to maintain the solution pH values in the dissolver 24 above 8 to minimize the concentrations of soluble metal species in the primary salt solution.

TABLE 2 pH Values for Minimum Solubility

| Metal species | pH at minimum solubility |
| --- | --- |
| Beryllium | 9.2 |
| Cadmium | 11.6 |
| Chromium ($Cr^{3+}$) | 8.0 |
| Copper | 9.0 |
| Lead | 10.6 |
| Mercury | 14.0 |
| Nickel | 10.8 |
| Plutonium | 7.8 |
| Silver | 14.0 |
| Uranium | 6.2 |
| Zinc | 9.4 |

Optionally, additional precipitation of the contaminants contained in the spent salt can be achieved by the addition of additional precipitate-inducing reagents 25, such as hydroxide and/or a sulfiding agent, in dissolver 24. Most metal sulfides have much lower solubilities than metal oxides and hydroxides in water. In order to further suppress the concentrations of metal species in the primary salt solution, sulfiding the solution with certain reagents can be employed. In one exemplary embodiment, a sulfiding agent containing sodium hydrogen sulfide, NaSH, can be added to the primary salt solution containing ions of carbonate, chloride, zinc, nickel, chromate, copper, cobalt, arsenic, and silver. Table 3 shows that the concentrations of metal ions in the primary salt solution after the sulfiding process are reduced by several orders of magnitude. During such a process, however, a venting system for the emission of $H_2S$, a by-product of the sulfiding reaction, should be employed.

TABLE 3

Effect of Sulfiding

| | Concentration of ions in solution*, ppm | |
|---|---|---|
| Metal | Before sulfiding | After sulfiding |
| As | 12.7 | $4.5 \times 10^{-4}$ |
| Cr | 177.0 | $6.8 \times 10^{-9}$ |
| Co | 6.4 | $9.9 \times 10^{-5}$ |
| Cu | 0.86 | $3.5 \times 10^{-13}$ |
| Ni | $6.6 \times 10^{-3}$ | $1.9 \times 10^{-12}$ |
| Ag | 2.57 | $1.1 \times 10^{-13}$ |
| Zn | $1.9 \times 10^{-4}$ | $4.3 \times 10^{-14}$ |

*at room temperature with solution pH value at 11

As the metals are precipitated from the primary salt solution (as well as from the later formed secondary salt solution), the metals usually form submicron size particles. Coagulating reagents such as Alum $[Al_2(SO_4)_3]$ can be very effective in facilitating the coagulation and increasing the rate of precipitation to avoid an excessive holding time in the dissolver tank, i.e., dissolver 24. The addition of coagulant aids such as activated silica can enhance coagulation by promoting the growth of large, rapid-settling flocs. Activated silica is a short-chain polymer that serves to bind together particles of microfine aluminum hydrate. For example, Table 4 shows that alum and activated silica reduce the time required for the start of precipitation from 85 minutes to 25 minutes for a spent salt containing 20% NaCl, 78.8% $Na_2CO_3$, and 0.2% $Na_2CrO_4$ dissolved in water with 1% dithionite added for the chromium reduction.

TABLE 4

Time Required for Precipitation is Reduced with Addition of Alum and Activated Silica

| Run ID | Coagulant $Al_2(SO_4)_3$ g/100 mL soln | Coagulant aid $SiO_2$ g/100 mL soln | Time, minutes |
|---|---|---|---|
| S | 0 | 0 | 85 |
| C1 | 0.015 | 0.001 | 75 |
| C2 | 0.15 | 0.01 | 25 |

Filtration (represented as step 26) of the primary salt solution can occur immediately after initial dissolution, particularly for "ash" /mineral residue removal, and/or after addition of reagents (e.g., hydroxides, sulfides, etc.) to further remove dissolved metal species. Selection of an appropriate filter element is necessary for complete capture of suspended solid particles. The pore size of the filter element is preferably one micron or less for high capture efficiency. The precipitated material is captured by continuously pumping the solution through the filter, such as a one micron pore size polypropylene filter, until the solution becomes relatively clear. At this stage in the process, any solid particles such as ash or silica can also adhere to the filter and be removed along with the precipitated metal species (e.g., oxides, hydroxides, sulfides, etc.) that is recovered. The filtration yields a filter cake (precipitate) encompassing a waste solid 28 containing a majority of the metal contaminants of the spent salt, (i.e., the majority waste solid), which can be dried, packaged and disposed of as a hazardous waste or immobiilized as ceramic pellets. The majority waste solid can contain above 50, and often up to about 75 or more weight percent of metal contaminants relative to their original amounts in the spent salt.

The accompanying filtrate of such a filtration, i.e., a secondary salt solution, contains the remaining (i.e., secondary) dissolved metal contaminants, particularly those metallic ion contaminants which, are still water soluble in significant concentrations, but have low solubility characteristics in the presence of oxides, hydroxides, sulfides, and the like, when reduced in valence state or oxidation number. A substant portion of the secondary dissolved metal contaminants are known as reducible metallic ions in the secondary salt solution. Addition of selected reducing agents or reagents 27 to the secondary salt solution may be required in one or more separate steps to convert the valence state of such dissolved metals into insoluble forms. For example, use of dithionites (e.g., sodium hydrosulfite and sodium hyposulfite) in the secondary metals precipitation step reduces soluble $Cr^{6+}$ to $Cr^{3+}$, with subsequent formation of the insoluble species $Cr(OH)_3/Cr_2O_3$. Solubilities of chromium hydroxide and chromium oxide vary with pH, but are very low in alkaline solutions. Other suitable reducing agents include ion powder, hydrogen peroxide, and hydrazine.

All but minimal amounts of the remaining (secondary) dissolved metal contaminants in the secondary salt solution are segregated by precipitation (as represented by step 29) during the addition of reducing agent 27 to the secondary salt solution. Subsequently, a second filtration (represented by step 30) is accomplished in essentially the same manner as above; resulting in (1) a second filtrate that is a clean salt solution 31 that contains mostly carbonate with normally low halides content and very low metals content, and (2) a second filter cake encompassing a second waste solid 32 having the secondary metal contaminants, i.e., a minority waste solid, containing less than 50, and ordinarily less than 33 weight percent of the original amount of metal contaminants contained in the spent salt. Normally the sum total of the majority and minority waste solids sent to disposal is less than 10%, and preferably less than 5% of the original weight of the spent salt removed from the MSO reactor.

In one embodiment, the clean solution 31 can then be dried (represented as step 34), preferably by spray drying, and the dried cleaned salt 35 reused or recycled to the MSO reactor. In another embodiment, the clean solution 31 can be sent to disposal. Dried salt 35, typically containing more than 20 wt. % carbonate salt, is usually recycled.

If the waste feed to MSO reactor is halogen-rich, sodium carbonate is essentially all converted to various sodium halides. When less than 20%, and clearly less than 10% of the salt melt is sodium carbonate, the melt's acid gas scrubbing capability and oxidation efficiency drop significantly, and the melt needs to be withdrawn and replaced. Because of its low carbonate content, heating the dissolver 24 or using warm water for salt dissolution can facilitate the process. Processing of the high-halide spent salt is similar to that of high-ash spent salt with the exception that the primary salt solution may be a weak alkaline solution or weak acidic solution. Solution pH values can be carefully adjusted to improve removal efficiencies of metal species; addition of NaOH or HCl may be used if necessary. After the secondary metals precipitation and the subsequent filtration, the clean salt solution 31 contains mostly halides with low carbonate content and very low metals content which can be discharged to disposal.

If the MSO reactor oxidizes waste feed which contains radionuclides, the radionuclides are captured and held in the salt. Most radioactive compounds (contaminants) co-precipitate with ash/mineral residue and can be removed from the primary salt solution after the initial dissolution and first filtration step. Some radionuclides, such as thorium and uranium, may form complex ions and stay in the solution. However, most uranium can be removed in the secondary metals precipitation step by adding complex ion breakers and/or reducing agents. An ion exchange column 36 is usually needed to further removed radionuclides from the secondary or cleaned solutions. A variety of commercial ion exchange resins are available; selection of the best resin can be based on radionuclide content of the waste.

If the original spent salt has low carbonate content (generally less than 20%), it is typically destined for disposal, and the pH of the filtered clean solution 31 can be adjusted to an optimum pH with an appropriate amount of acid (e.g., HCl). The filtered clean solution is pumped several times through a column of ion exchange resin for further radionuclide removal. The desired pH is dependent on the type of ion exchange resin chosen. Diphonix™, a commercial ion exchange resin, has been found to work for this application and is effective at a pH of about 5.5. This procedure yields a solution containing less than 0.1 ppm of radionuclide. The clean aqueous salt solution 31A can then be discarded as non-hazardous waste, and the ion exchange resin can be destroyed in the MSO reactor.

Figure 3:
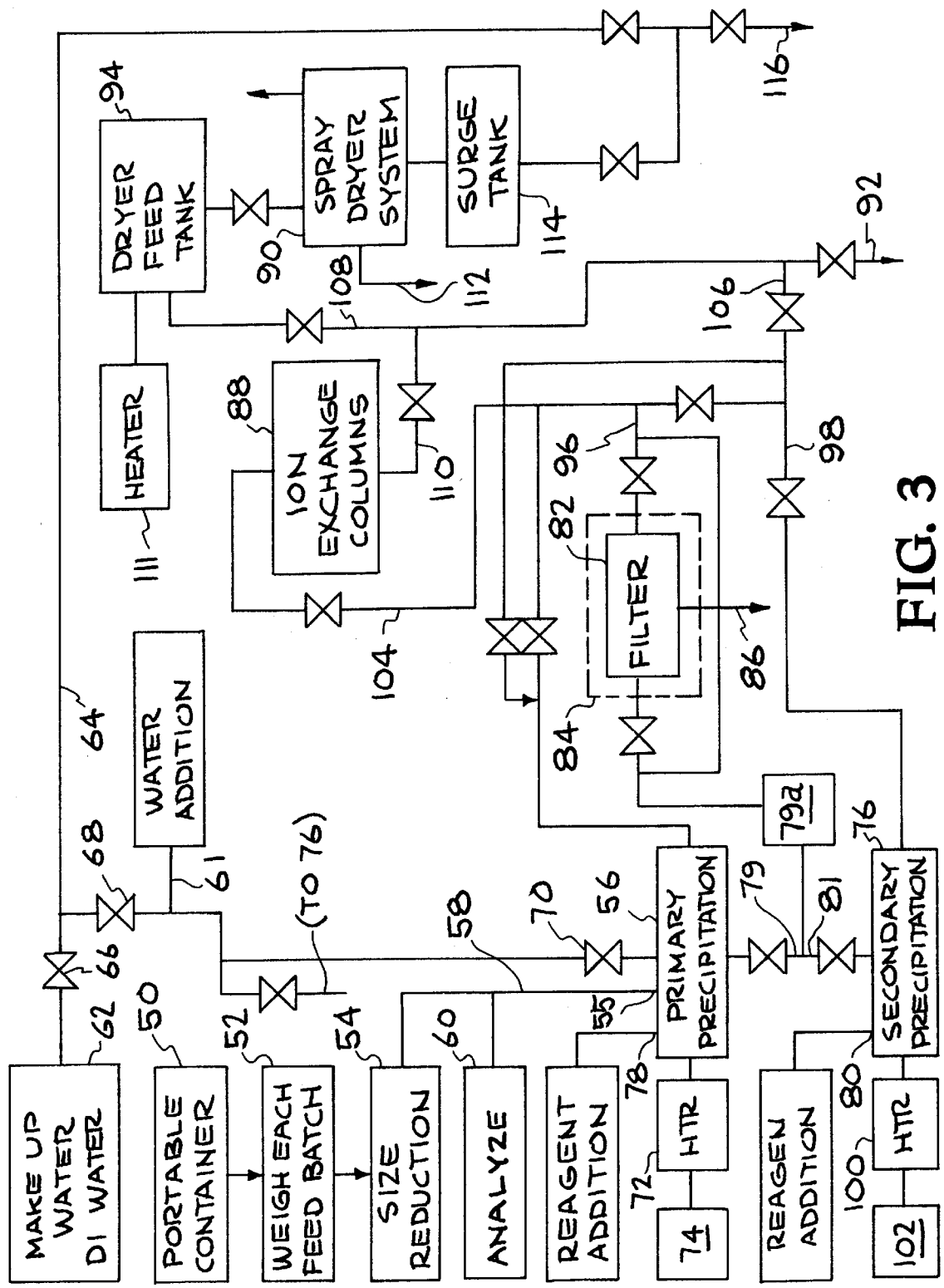
FIG. 3 is a salt recycle system flow diagram illustrating the apparatus of the invention.

The apparatus of the invention can be illustrated by the salt cleanup system depicted in FIG. 3. The salt recycle system apparatus receives spent salts, normally in solid form, from the MSO reactor, not shown, and off-gas system by any convenient means, such as a portable container 50, or other solid or liquid transporting means. The amount of spent salt received is weighed on conventional scales 52, load cells, or other equivalents. For example, a sample of solid spent salt weighing about 160 kg. is size-reduced to approximately 6.3 mm by size-reducing means 54 such as by using hand tools, air-power tools, and a crusher, and the like, which are all done inside an enclosure. Spent salt particles are then transferred via a solids inlet 55 to a first precipitation vessel, such as tank 56 by solids transferring means 58, such as a spiral conveyor, a conduit, a pneumatic conveyor, and the like. Although not shown, the small salt particles can be dissolved in liquid (e.g., water) and fed as a slurry, etc., into tank 56 by conduit and liquid inlet. Spent salt samples can be taken during salt crushing for analysis by conventional analytical means 60, such as XRF, ICP-MS, and Ion chromatography, prior to transfer to tank 56. Spent salt dissolution is performed in tank 56 using water (via conduit 61), either deionized water 62 or clean recycled water 64 having controlled flow through a system of valves 66, 68 and 70, respectively, into tank 56. The salt dissolution step can be controlled at 25–50 degrees C., and preferably at 30–40° C., by heating means such as an immersion heater 72 and a temperature controller 74 to minimize the amount of liquid (water) required. Most of the mineral residues and ashes from the salt precipitate as hydroxides and oxides during the dissolution step, usually in tank 56. Chemical reagents such as sodium hydroxide, hydrochloric acid, and dithionite can be used at various stages of the dissolution and precipitation process to adjust pH and/or facilitate precipitate formation, including facilitating contaminant metals removal. Precipitating-enhancing reagents, such as Alum [$Al_2(SO_4)_3$] and activated silica, can be added to facilitate the coagulation and precipitation process to avoid an excessive holding time in tank 56. Such reagents can be fed into tank 56 or a downstream second precipitation vessel (described below), i.e., second tank 76 via inlets 78 and 80, respectively, by for instance the use of metering pumps or by opening a hatch.

Once precipitated, these second solids, i.e., the majority waste solids, can then be removed via liquid and/or solids outlet 79, for instance, by pumping (via pump 79A) the precipitate/solution through a separator 82 such as a filter or the like. For example, the filter includes filter media of about 1 micron and can efficiently remove solid particles from the primary salt solution to produce the secondary salt solution. The filter element may be pre-coated with a thin layer of diatomaceous earth or other filter aid to facilitate the filtration process. The filtration operation is normally performed inside an enclosure 84 to prevent atmospheric exposure of the hazardous contaminants. At the conclusion of the salt recycle, the filter cake (i.e., majority waste solid) should be removed from the filter. Although not shown, apparatus for air and water addition to separator 82 can be employed to assist the majority waste solid removal. The wet majority waste solids are then transported to a waste solid encapsulation area 86 for immobilization and disposal.

After the initial metals precipitation, the secondary salt solution effluent from separator 82 in conduit 96 can be transported via conduit 98 to the second metals precipitation vessel 76 including a heater 100 and temperature controller 102, and/or via conduit 104 to ion exchange columns 88, and/or via bypass conduit 106 to a dryer such as spray dryer 90, and/or to portable containers 92 which can contain clean salt solution depending on the concentrations of carbonate and metal contaminants, including radionuclides. Particularly in the case in which an unacceptable portion of the secondary dissolved metal contaminants are the reducible metallic ions in the secondary salt solution, the addition of selected reducing agents or reagents via inlet 80 to the secondary salt solution in second precipitation vessel 76 can be achieved in one or more separate steps to convert the valence state of such dissolved metals into insoluble forms and the precipitate/solution pumped via conduit 81 to separator 82 and the eventual separation into the minority waste solids and clean salt solution. If the spent salt contains high levels of carbonate, then the secondary salt solution should be pumped to a dryer feed container 94 for spray drying. If it contains low levels of carbonate and traces of uranium and thorium, then the secondary salt solution should be pumped to the ion exchange columns 88 after a pH adjustment for removal of radionuclides. In some instances, the secondary salt solution can be pumped to portable containers 92 and transported to hazardous waste management areas.

Spray dryer 90 is an integral part of the salt recycle system. It can a receive clean salt solution via conduit 108 from a clean secondary salt solution via conduit 96 from the precipitation vessel and bypass system conduit 106, or from conduit 110 from the ion exchange columns 88. The spray dryer system includes a heater such as a natural gas-fired air heater 111, a cyclone separator for collecting clean dry salt and a venturi scrubber as well as an absorber for gas cooling and dust control. The clean dry salt can be collected in storage means 112 and returned to the MSO reactor (not shown) for reuse, for example, in well-sealed drums. The air leaving the absorber is usually filtered and disposed, e.g., passes through a HEPA filter and exhausts. The secondary salt solution or a clean solution from the venturi scrubber is pumped through, for instance, a surge tank 114 for reuse via conduit 64 or to discharge 116, in portable or mobile containers, conduits, and the like.

The invention is further illustrated by the following example which is illustrative of a specific mode of practicing the invention and is not intended as limiting the scope of the invention as defined in the appended claims.

EXAMPLE

An MSO reactor constructed with salt bed capacity of up to 100 kg. is run for several hundred hours using various feed materials, including chlorinated hydrocarbons, with effective results. The chloride content in the salt bed of the reactor is brought to >90 wt % as a result of oxidizing chlorinated organic liquids. The spent salt from the MSO reactor serves as an excellent source of spent salt material for operating an efficient spent salt clean-up process.

1. Salt Freezing, Grinding, and Analysis. The salt melt is removed from the reactor after being used for six months, and frozen into large pieces, several kilograms in size. These large pieces are then hammered and ground into salt particles smaller than 12 mm. X-ray Fluorescence (XRF) is used to determine the elemental composition of spent salt, which is shown in Table 5.

TABLE 5

Elemental Composition of MSO Spent Salt

| Element | Composition, wt % | Element | Composition, wt % |
|---|---|---|---|
| C | 0.99 | O | 1.98 |
| Na | 38.69 | Si | 0.04 |
| P | 0.01 | S | 0.08 |
| Cl | 57.54 | K | 0.01 |
| V | 0.014 | Cr | 0.48 |
| Mn | 0.03 | Fe | 0.04 |
| Ni | 0.04 | Cu | 0.03 |
| Br | 0.00 | Mo | 0.02 |
| Pt | 0.01 | | |

Table 5 indicates that the spent salt contains about 95 wt % sodium chloride along with minor amounts of several metals. The metallic elements in the spent salt are mostly from the corrosion of the Inconel 600 reactor and internal components such as stainless steel baffles. Although the percentage of metals in the spent salt is only about 1 wt %, it can be further reduced by using Inconel as the construction materials for internal components. Many of the metals present are at levels exceeding the Resource Conservation and Recovery Act (RCRA) land-ban criteria and this salt can be considered a hazardous waste if disposed of without further clean-up.

2. Dissolution of Spent Salt. FIG. 1 can be illustrative for a flowsheet for the present clean-up method. Four hundred grams of ground spent salt is dissolved into 1500 mL of ambient deionized water with agitation in a 2 L glass beaker. The dissolution takes less than 30 minutes, with no appreciable temperature rise—an indication of very low carbonate content in the spent salt. The primary salt solution is dark in color, with suspended particles of metal hydroxides and metal oxides. The primary salt solution is slightly acidic (pH value of 6.2), due, at least in part, to the presence of metallic ions. A portable colorimeter, along with several analytical kits which are inexpensive, fast, and fairly accurate, are used to analyze ion concentrations in the primary salt solution. Formation, coagulation, and precipitation of metal hydroxides/metal oxides can be slow; consequently, soluble metal ion concentrations vary with time. Solution analysis is done before deciding whether sulfiding is required. To establish a baseline, no initial sulfiding is done while the solution is allowed to settle for 40 hours before filtration. The primary salt solution is analyzed at 1 hour, 22 hours and 40 hours; the results are shown in Table 6.

Table 6 indicates that chloride concentration in the primary salt solution is 120,000 ppm, or 94 wt % of sodium chloride in dry spent salt. Concentrations of soluble metal species, except $Cr^{6+}$, are very low due to their low solubilities in water. Concentrations of several metal ions, e.g. $Fe^{2+}/Fe^{3+}$ and $Ni^{2+}$, decreased with settling time, an indication of possible slow kinetics of metal oxide formation. Sulfiding the solution with sodium hydrogen sulfide, NaSH, enhances the removal efficiency of metal ions due to extremely low solubilities of metal sulfides in water and improved kinetics.

TABLE 6

Solution Analysis

| | Concentrations, ppm | | | | |
|---|---|---|---|---|---|
| Species | 1 hr* | 22 hrs | 40 hrs | 64 hrs | After Cr Removal |
| $Cl^-$ | 120,000 | | | | 120,000 |
| $Fe^{+2}/Fe^{+3}$ | 21.0 | 5.0 | 6.5 | | 2.8 |
| $Ni^{+2}$ | 45.0 | 9.7 | 9.5 | | 2.0 |
| $Cr^{+6}$ | 540.0 | 560.0 | 525.0 | | 0.5 |
| $Mn^{+2}$ | | 17.4 | 17.5 | | 20.6 |
| $SiO_2$ | | 340.0 | 350.0 | | 60.0 |
| $SO_4^{-2}$ | | | 200.0 | | 2600.0 |
| $Cu^{+2}$ | | | | 6.4 | 0.5 |
| $Zn^{+2}$ | | | | 1.3 | 0.5 |
| $Mo^{+6}$ | | | | 131.0 | 46.0 |
| $PO_4^{-3}$ | | | | 5.5 | 0.5 |
| $NO_3-$ | | | | 4.6 | 16.4 |
| Solution No. | 1 | 1 | 1 | 2 | 3 |

*Dithionite is added for Cr removal a week after dissolving the salt.

3. First Filtration/First Drying. The primary salt solution is then filtered with a Whatman 542 filter paper, which has an average pore size 2.7 microns. Filtration is slow, less than 0.3 mL/min/cm², probably due to presence of spongy metal hydroxides/oxides. The wet solid, after drying (Majority Waste Solid, from FIG. 1), is analyzed using XRF. Table 7 shows the results. As expected, solid 1 contains mostly oxides of metals such as Ni, Cr, Fe, Mn, Cu, etc., which are major alloying elements of Inconel and stainless steel, along with minor amounts of Na and Cl due to coprecipitation.

TABLE 7

Elemental Composition of Solids 1 & 2

| | Compositions, wt % | |
|---|---|---|
| Element | Solid 1 | Solid 2 |
| Na | 2.39 | 5.84 |
| Al | 0.23 | 0.02 |
| Si | 0.63 | 0.16 |
| P | 1.01 | 0.07 |
| S | 0.13 | 5.62 |
| Cl | 1.02 | 3.16 |
| K | 0.09 | 0 |

TABLE 7-continued

Elemental Composition of Solids 1 & 2

| | Compositions, wt % | |
|---|---|---|
| Element | Solid 1 | Solid 2 |
| Ca | 0.25 | 0.51 |
| Ti | 0.03 | 0 |
| V | 1.45 | 0.29 |
| Cr | 13.1 | 22.9 |
| Mn | 4.74 | 0.65 |
| Fe | 7.45 | 0.01 |
| Co | 0.12 | 0.01 |
| Ni | 13.4 | 0.16 |
| Cu | 5.67 | 0.26 |
| Zn | 0 | 0.06 |
| Mo | 0.34 | 0.52 |
| W | 0.37 | 0.21 |
| Elements lighter than Na | 47.68 | 59.55 |

4. Chromate Removal (Dithioniting). The filtrate, the secondary salt solution, is light greenish-yellow in color. Dithionite, $Na_2S_2O_4$, an effective reducing agent which works well in neutral and alkaline solution, is used and the reaction is shown as follows:

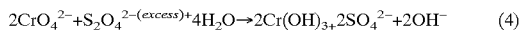

$$2CrO_4^{2-}+S_2O_4^{2-(excess)}+4H_2O \rightarrow 2Cr(OH)_3+2SO_4^{2-}+2OH^- \quad (4)$$

Chromum hydroxide, a green gelatin-like solid, precipitated as a result of the reaction. Excess dithionite is normally required to improve the conversion efficiency. For the current experiment, 8X stoichiometry is used and the result is excellent, as shown in Table 6. Concentration of $Cr^{6+}$ dropped to <1 ppm from >500 ppm. Table 6 also shows that sulfate ions in the solution, a benign species which is not a concern, increased from 200 ppm to 2600 ppm after the dithioniting step. The result indicates that dithioniting is an excellent means to remove chromium from the solution.

5. Second Filtration/Additional Drying. The secondary salt solution is then filtered to remove chromium hydroxide with a Whatman 542 filter paper. Filtration speed is measured at about 1 mL/min/cm², which is faster than that of the first filtration. The filter cake is dried to produce Minority Waste Solid at 100° C. in an oven overnight and sent to Analytical Laboratory for XRF analysis. The composition of the Minority Waste Solid is also shown in Table 7. It indicates a high content of chromium in the solid, along with coprecipitants such as sodium chloride and sodium sulfate. Quantities of other metal species are small. The Majority Waste Solid and Minority Waste Solid can be combined and sent for disposal. In the mixed waste management facility, proposed in 1994 (MWMF) project, such solids may contain radionuclides, and are encapsulated in a ceramic final form. Combined weight of the Majority Waste Solid and the Minority Waste Solid is only about 4.3 grams, about 1.1 wt % of the weight of spent salt initially dissolved. This is a significant reduction in the amount of toxic material for disposal.

The second filtrate, is a clean salt solution and can be dried to yield dean salt. Table 8 shows concentrations of salt species, after the clean-up process, along with the Universal Treatment Standards (UTS) for allowable land disposable level without polymer encapulation.

TABLE 8

Solution Analysis

| | Concentrations, ppm | | |
|---|---|---|---|
| Species | In solution | Dry salt residue | UTS Limit |
| Fe | 2.8 | 13.9 | NR |
| Ni | 2.0 | 9.9 | 100.0 |
| Mn | 20.6 | 102.0 | NR |
| Cu | 0.5 | 2.5 | 250.0* |
| Zn | 0.5 | 2.5 | 105.0 |
| Cr** | 0.5 | 2.5 | 16.5 |
| Mo | 46.0 | 228.0 | 3500.0* |
| As** | 0.5 | 2.5 | 100.0 |
| Se** | 0.9 | 4.5 | 3.3 |
| Ba** | 0.04 | 0.2 | 152.0 |
| Be, Cd, Pb, Ag, V, Co, Tl are undetectable by ICP/MS | | | |

*Per STLC standard.
**measured by ICP/MS, total chromium is about 6 ppm due to small particles of chromium hydroxide, $Cr(OH)_3$, which passes through the 2.7 micron filter. Use of a finer pore-size of filter element can eliminate such passage.

The results show that most metals in the spent salt precipitate out during the initial dissolution process. Further removal of metal contaminants such as, chromium is accomplished by the addition of a reducing agent to the secondary salt solution (in the dithioniting step).

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A method for removing metal contaminants from a spent salt of a molten salt oxidation (MSO) reactor, comprising:
   (a) dissolving the spent salt in water to form a salt solution;
   (b) precipitating and removing a majority of the metal contaminants from the salt solution and concurrently producing a secondary salt solution;
   (c) adding at least one reducing agent to the secondary salt solution to produce a second precipitate containing a minority of the metal contaminants; and
   (d) removing the second precipitate from the secondary salt solution to produce a clean salt solution.

2. The method as recited in claim 1, further comprising passing the clean salt solution through an ion exchange column after removing the second precipitate to further remove metal contaminants remaining in the secondary salt solution.

3. The method as recited in claim 2, wherein the clean salt solution has a metal contaminant concentration less than about 0.1 ppm after passing through the ion exchange column.

4. The method as recited in claim 1, wherein the spent salt comprises a carbonate, and further comprising determining a carbonate concentration of the spent salt.

5. The method as recited in claim 4, wherein a salt obtained from the clean salt solution is returned to the MSO reactor.

6. The method as recited in claim 1, further comprising adjusting a pH of the salt solution to a higher alkaline concentration before precipitating one or more metallic ions from the metal contaminants.

7. The method as recited in claim 1, wherein the reducing agent is selected from the group consisting of a dithionite, hydrazine, peroxide, ion powder and hydroxide.

8. The method as recited in claim 1, wherein the second precipitate comprises an oxide or hydroxide of a metallic ion having a lower oxidation state than its corresponding reducible metallic ion contained in the salt solution.

9. The method as recited in claim 8, wherein a precipitate obtained in step (b) comprises a metal oxide and the second precipitate comprises chromium oxide.

10. The method as recited in claim 1, wherein the second precipitate comprises chromium oxide or chromium hydroxide.

11. The method as recited in claim 1, wherein a precipitate obtained from step (b) comprises an oxide or sulfide of a metal contaminant contained in the spent salt.

12. The method as recited in claim 1, wherein a precipitate obtained in step (b) comprises a metal contaminant selected from the group consisting of nickel, zinc, iron, molybdenum, manganese, copper, lead, silver, arsenic, barium, berryllium, cadmium, antimony, cobalt, selenium, thallium, vanadium, thorium, and uranium.

13. The method as recited in claim 1, further comprising spray drying the secondary salt solution to produce a dried salt after removing the second precipitate and recycling the dried salt.

14. The method as recited in claim 1, wherein a salt obtained from the clean salt solution is returned to the MSO reactor.

15. The method as recited in claim 1, wherein the reducing agent is selected from the group consisting of sodium hydrosulfite and sodium hyposulfite.

16. The method as recited in claim 1 wherein a precipitate obtained from step (b) and the second precipitate comprise less than 10 wt. % of the spent salt.

17. The method of claim 1, wherein said removing steps are performed using filters.

18. A method for removing metal contaminants from a spent salt of a molten salt oxidation (MSO) reactor, comprising:
    (a) lowering a temperature of a molten salt obtained from the MSO reactor to produce a spent salt solid;
    (b) reducing the size of particles of the spent salt solid;
    (c) dissolving the spent salt in water to form a salt solution comprising the metal contaminants and chromium ions;
    (d) removing a majority waste solid from the salt solution and concurrently producing a secondary salt solution comprising chromium ions;
    (e) adding at least one reducing agent to the secondary salt solution to produce a minority waste solid comprising more chromium ions than contained in said majority waste solid; and
    (f) removing the minority waste solid from the secondary salt solution to produce a clean salt solution.

19. The method as recited in claim 18, wherein water is removed from the clean salt solution to produce a dried salt, and further returning the dried salt to the MSO reactor for reuse.

20. The method as recited in claim 19, wherein said clean salt solution and said dried salt comprise carbonate.

21. The method as recited in claim 19, wherein the reducing agent comprises a dithionite.

22. The method as recited in claim 18, wherein the clean salt solution is passed to disposal.

23. The method as recited in claim 22, further comprising passing the clean salt solution through an ion exchange column prior to the clean salt solution being passed to disposal.

24. The method as recited in claim 18, wherein the majority waste solid and the minority waste solid comprise less than 5 wt. % of the spent salt solid.

25. The method of claim 18, wherein said removing steps are performed using filters.

26. A method for removing metal contaminants from a spent salt of a molten salt oxidation (MSO) reactor, comprising:
    (a) dissolving the spent salt in water to form a salt solution;
    (b) precipitating and filtering out a majority of the metal contaminants from the salt solution and concurrently producing a secondary salt solution;
    (c) adding at least one reducing agent to the secondary salt solution to produce a second precipitate containing a minority of the metal contaminants; and
    (d) removing the second precipitate from the secondary salt solution to produce a clean salt solution.

27. A method for removing metal contaminants from a spent salt of a molten salt oxidation (MSO) reactor, comprising:
    (a) lowering the temperature of a molten salt obtained from the MSO reactor to produce a spent salt solid;
    (b) reducing size of particles of the spent salt solid;
    (c) dissolving the spent salt in water to form a salt solution comprising the metal contaminants and chromium ions;
    (d) performing a first filtering step to remove a majority waste solid from the salt solution and concurrently producing a secondary salt solution comprising chromium ions;
    (e) adding at least one reducing agent to the secondary salt solution to produce a minority waste solid comprising more chromium ions than contained in said majority waste solid; and
    (f) performing a second filtering step to remove the minority waste solid from the secondary salt solution to produce a clean salt solution.

28. A method for removing metal contaminants from a spent salt of a molten salt oxidation (MSO) reactor, comprising:
    (a) dissolving the spent salt in water to form a salt solution;
    (b) precipitating and removing a majority of the metal contaminants from the salt solution and concurrently producing a secondary salt solution;
    (c) adding at least one reducing agent to the secondary salt solution to produce a second precipitate containing a minority of the metal contaminants;
    (d) removing the second precipitate from the secondary salt solution to produce a clean salt solution; and
    wherein a precipitate obtained from step (b) and the second precipitate comprise less than 10 wt. % of the spent salt.

29. A method for removing metal contaminants from a spent salt of a molten salt oxidation (MSO) reactor, comprising:
    (a) lowering the temperature of a molten salt obtained from the MSO reactor to produce a spend salt solid;
    (b) reducing the size of particles of the spent salt solid;
    (c) dissolving the spent salt in water to form a salt solution comprising the metal contaminants and chromium ions;
    (d) removing a majority waste solid from the salt solution and concurrently producing a secondary salt solution comprising chromium ions;
    (e) adding at least one reducing agent to the secondary salt solution to produce a minority waste solid comprising more chromium ions than contained in said majority waster solid;

(f) removing the minority waste solid from the secondary salt solution to produce a clean salt solution; and wherein the majority waste solid and the minority waste solid comprise less than 5 wt. % of the spent salt solid.

30. A method for removing metal contaminants from a spent salt of a molten salt oxidation (MSO) reactor, comprising:

(a) dissolving the spent salt in water to form a salt solution;

(b) precipitating, removing and forming into pellets a majority of the metal contaminants from the salt solution and producing a secondary salt solution;

(c) adding at least one reducing agent to the secondary salt solution to produce a second precipitate containing a minority of the metal contaminants; and (d) removing the second precipitate from the secondary salt solution to produce a clean salt solution.

31. A method for removing metal contaminants from a spent salt of a molten salt oxidation (MSO) reactor, comprising:

(a) lowering the temperature of a molten salt obtained from the MSO reactor to produce a spend salt solid;

(b) reducing the size of particles of the spent salt solid;

(c) dissolving the spent salt in water to form a salt solution comprising the metal contaminants and chromium ions;

(d) removing a majority waste solid from the salt solution and forming the majority waste solid into pellets including ceramic powder and producing a secondary salt solution comprising chromium ions;

(e) adding at least one reducing agent to the secondary salt solution to produce a minority waste solid comprising more chromium ions than contained in said majority waster solid; and (f) removing the minority waste solid from the secondary salt solution to produce a clean salt solution.

* * * * *